United States Patent
Hashimoto et al.

(10) Patent No.: US 7,270,193 B2
(45) Date of Patent: Sep. 18, 2007

(54) METHOD AND SYSTEM FOR DISTRIBUTING PROGRAMS USING TAMPER RESISTANT PROCESSOR

(75) Inventors: Mikio Hashimoto, Chiba (JP);
Kensaku Fujimoto, Kanagawa (JP);
Kenji Shirakawa, Kanagawa (JP);
Keiichi Teramoto, Tokyo (JP); Takeshi Saito, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 431 days.

(21) Appl. No.: 09/781,284

(22) Filed: Feb. 13, 2001

(65) Prior Publication Data

US 2001/0014157 A1    Aug. 16, 2001

(30) Foreign Application Priority Data

Feb. 14, 2000  (JP) .............................. P2000-35898
May 8, 2000   (JP) ........................... P2000-135010

(51) Int. Cl.
*H04L 9/00*        (2006.01)

(52) U.S. Cl. ...................... 173/175; 713/194; 380/277; 380/278; 709/203; 717/172; 717/177

(58) Field of Classification Search ................ 713/165, 713/167, 187, 715, 168, 175, 193–194; 380/277–278; 726/3; 709/201, 203; 717/172–173, 177–178
See application file for complete search history.

(56) References Cited

U.S. PATENT DOCUMENTS

| | | | |
|---|---|---|---|
| 4,168,396 A | 9/1979 | Best | |
| 4,847,902 A | 7/1989 | Hampson | |
| 5,208,173 A | 5/1993 | Yamada et al. | |
| 5,224,166 A | 6/1993 | Hartman, Jr. | |
| 5,701,343 A | 12/1997 | Takashima et al. | |
| 5,825,878 A | 10/1998 | Takahashi et al. | |
| 6,330,549 B1 * | 12/2001 | Merkle | ........................ 705/51 |

(Continued)

FOREIGN PATENT DOCUMENTS

JP          05-020197          1/1993

(Continued)

OTHER PUBLICATIONS

T. Gilmont, et al., Electronics Letters, vol. 35, No. 24, pp. 2096-2098, "Hardware Security for Software Privacy Support", Nov. 25, 1999.

(Continued)

*Primary Examiner*—T. B. Truong
(74) *Attorney, Agent, or Firm*—Oblon, Spivak, McClelland, Maier & Neustadt, P.C.

(57) ABSTRACT

A scheme for distributing executable programs through a network from a program distribution device to a client device having a tamper resistant processor which is provided with a unique secret key and a unique public key corresponding to the unique secret key in advance is disclosed. In this scheme, a first communication path is set up between the program distribution device and the client device, and a second communication path directly connecting the program distribution device and the tamper resistant processor is set up on the first communication path. Then, the encrypted program is transmitted from the program distribution device to the tamper resistant processor through the second communication path.

19 Claims, 5 Drawing Sheets

U.S. PATENT DOCUMENTS

| | | | |
|---|---|---|---|
| 6,429,879 B1* | 8/2002 | Sturgeon et al. | 715/723 |
| 6,468,160 B2* | 10/2002 | Eliott | 463/43 |
| 6,473,860 B1* | 10/2002 | Chan | 713/193 |
| 6,510,519 B2* | 1/2003 | Wasilewski et al. | 713/168 |
| 6,567,915 B1* | 5/2003 | Guthery | 713/168 |
| 6,691,226 B1* | 2/2004 | Frank et al. | 713/100 |
| 6,704,872 B1* | 3/2004 | Okada | 713/194 |
| 6,836,847 B1* | 12/2004 | Zinger et al. | 713/200 |
| 2001/0014157 A1 | 8/2001 | Hashimoto et al. | |
| 2001/0042043 A1* | 11/2001 | Shear et al. | 705/51 |
| 2003/0154387 A1* | 8/2003 | Evans et al. | 713/193 |

FOREIGN PATENT DOCUMENTS

| | | |
|---|---|---|
| JP | 06-112937 | 4/1994 |
| JP | 08-305558 | 11/1996 |
| JP | 11-282667 | 10/1999 |
| JP | 2002-140236 | 5/2002 |
| JP | 2002526822 | 8/2002 |

OTHER PUBLICATIONS

A. Herzberg, et al., 8277 ACM Transactions on Computer Systems, vol. 5, No. 4, pp. 371-393, "Public Protection of Software", Nov. 1, 1987.

U.S. Appl. No. 11/060,704, filed Feb. 18, 2005, Haruki et al.

U.S. Appl. No. 09/781,284, filed Feb. 13, 2001, Hashimoto et al.

U.S. Appl. No. 10/948,313, filed Sep. 24, 2004, Hashimoto.

* cited by examiner

METHOD AND SYSTEM FOR DISTRIBUTING PROGRAMS USING TAMPER RESISTANT PROCESSOR

BACKGROUND OF THE INVENTION

1. Field of the Invention

The present invention relates to a method and a system for distributing encrypted executable programs through a public network such as Internet to hardware devices with built-in microprocessors such as PCs.

2. Description of the Background Art

In recent years, the performance of a microprocessor has improved considerably such that the microprocessor is capable of realizing reproduction and editing of video images and audio sounds, in addition to the conventional functions such as computations and graphics. By implementing such a microprocessor in a system designed for end-user (which will be referred to as PC hereafter), the users can enjoy various video images and audio sounds on monitors. Also, by combing the function for reproducing video images and audio sounds with the computational power of the PC, the applicability to games or the like can be improved. Such a microprocessor is not designed for any specific hardware and can be implemented in a variety of hardwares so that there is an advantage that the users who already possess PCs can enjoy reproduction and editing of video images and audio sounds inexpensively by simply changing a microprocessor for executing programs.

In the case of handling video images and audio sounds on PCs, there arises a problem of a protection of the copyright of original images or music. In the MD or digital video playback devices, unlimited copies can be prevented by implementing a mechanism for preventing the illegal copying in these devices in advance. It is rather rare to attempt the illegal copying by disassembling and altering these devices, and even if such devices are made, there is a worldwide trend for prohibiting the manufacturing and sales of devices altered for the purpose of illegal copying by laws. Consequently, damages due to the hardware based illegal copying are not very serious.

However, image data and music data are actually processed on the PC by the software rather than the hardware, and the end-user can freely alter the software on the PC. Namely, if the user has some level of knowledge, it is quite feasible to carry out the illegal copying by analyzing programs and rewriting the executable software. In addition, there is a problem that the software for illegal copying so produced can be spread very quickly through media such as networks, unlike the hardware.

In order to resolve these problems, there are propositions of a microprocessor having a function for preventing the analysis and the alteration of programs (R. Hartman, U.S. Pat. No. 5,224,166; T. Gilmont, et al., "Hardware Security for Software Privacy Support", Electronic Letters, Vol. 35, No. 24, pp. 2096-2098, November 1999; M. Hashimoto, et al., Japanese Patent Application No. 2000-135010). In particular, in the microproccessor proposed by Japanese Patent Application No. 2000-135010, programs are protected from the analysis and the alteration by encrypting all of instructions, execution states and data which are three types of elements constituting programs in the multi-task environment.

In these microprocessors, a secret key and a decryption function using the secret key are provided inside the processor such that encrypted programs can be read from an external processor, decrypted and executed either directly or indirectly by using a public key corresponding to the secret key. Using these microprocessors, the analysis and the alteration of programs can be made considerably more difficult in principle, compared with the tamper resistant software technique. A microprocessor having this function will be referred to as a tamper resistant microprocessor in the following.

Now, in the case of using these processors, programs must be provided from program vendors in a state of being encrypted by using a public key of the processor either directly or indirectly. However, there is no known scheme for realizing such a program distribution safely.

SUMMARY OF THE INVENTION

It is therefore an object of the present invention to provide a program distribution device capable of distributing programs to a client side device through a network safely.

It is another object of the present invention to provide a client side devices capable of receiving programs distributed through a network safely.

It is another object of the present invention to provide a program distribution system capable of distributing programs through a network safely.

It is another object of the present invention to provide a method for distributing programs through a public network safely.

According to one aspect of the present invention there is provided a program distribution device for distributing executable programs through a network to a client device having a tamper resistant processor which is provided with a unique secret key and a unique public key corresponding to the unique secret key in advance, the program distribution device comprising: a first communication path set up unit configured to set up a first communication path between the program distribution device and the client device; a second communication path set up unit configured to set up a second communication path directly connecting the program distribution device and the tamper resistant processor, on the first communication path; an encryption processing unit configured to produce an encrypted program by encrypting an executable program to be distributed to the client device; and a transmission unit configured to transmit the encrypted program to the tamper resistant processor through the second communication path.

According to another aspect of the present invention there is provided a client device for receiving programs distributed from a program distribution device through a network, the client device comprising: a tamper resistant processor which is provided with a unique secret key and a unique public key corresponding to the unique secret key in advance; a first communication path set up unit configured to set up a first communication path between the program distribution device and the client device; a second communication path set up unit configured to set up a second communication path directly connecting the program distribution device and the tamper resistant processor, on the first communication path; and a program receiving unit configured to receive an encrypted program from the program distribution device through the second communication path.

According to another aspect of the present invention there is provided a program distribution system, comprising: a program distribution device connected to a network, for distributing executable programs through the network; and a client device connected to the network, for receiving the executable programs distributed from the program distribution device through the network; wherein the client device has: a tamper resistant processor which is provided with a unique secret key and a unique public key corresponding to the unique secret key in advance; a client side first communication path set up unit configured to set up a first communication path between the program distribution device and the client device; a client side second communication path set up unit configured to set up a second communication path directly connecting the program distribution device and the tamper resistant processor, on the first communication path; and a program receiving unit configured to receive an encrypted program from the program distribution device through the second communication path; and the program distribution device has: a server side first communication path set up unit configured to set up the first communication path between the program distribution device and the client device; a server side second communication path set up unit configured to set up the second communication path directly connecting the program distribution device and the tamper resistant processor, on the first communication path; an encryption processing unit configured to produce the encrypted program by encrypting an executable program to be distributed to the client device; and a transmission unit configured to transmit the encrypted program to the tamper resistant processor through the second communication path.

According to another aspect of the present invention there is provided a method for distributing executable programs through a network from a program distribution device to a client device having a tamper resistant processor which is provided with a unique secret key and a unique public key corresponding to the unique secret key in advance, the method comprising the steps of: setting up a first communication path between the program distribution device and the client device; setting up a second communication path directly connecting the program distribution device and the tamper resistant processor, on the first communication path; producing an encrypted program by encrypting an executable program to be distributed to the client device, at the program distribution device; and transmitting the encrypted program from the program distribution device to the tamper resistant processor through the second communication path.

Other features and advantages of the present invention will become apparent from the following description taken in conjunction with the accompanying drawings.

DETAILED DESCRIPTION OF THE PREFERRED EMBODIMENTS

First, the major features of the present invention will be described briefly.

The present invention provides a program distribution device for distributing executable programs through a network to a client device with a built-in tamper resistant microprocessor, where the microprocessor is provided with a unique secret key and a unique public key corresponding to this secret key in advance. This program distribution device has an encryption processing unit which encrypts a program by using a unique public key that is sent from the microprocessor of the client device, or encrypts a program by using arbitrary ciphering key and encrypts this ciphering key by using a unique public key that is sent from the microprocessor of the client device. The encrypted ciphering key is then distributed to the client device along with the encrypted program.

In the program distribution method of the present invention, a first communication path is set up to the program distribution device from the client device through a network. Then, a second communication path for directly connecting the microprocessor to the program distribution device is set up on the first communication path. The unique public key is sent from the microprocessor to the program distribution device through the second communication path. This public key sent through the network is received at the program distribution device and a program is encrypted by the program distribution device. The encrypted program is then directly send to the microprocessor of the client device through the second communication path.

The program distributed in this way is either encrypted by the unique public key of the microprocessor of the client device, or encrypted by a common key and this common key is encrypted by the unique public key of the microprocessor. The program is directly transmitted to the microprocessor without being intercepted by any computer and can be decrypted only by the microprocessor which has the unique secret key corresponding to this public key. In this way, it is possible to prevent the illegal decryption by a third party effectively.

Referring now to FIG. 1 to FIG. 5, one embodiment of the program distribution system according to the present invention will be described in detail.

Figure 1:
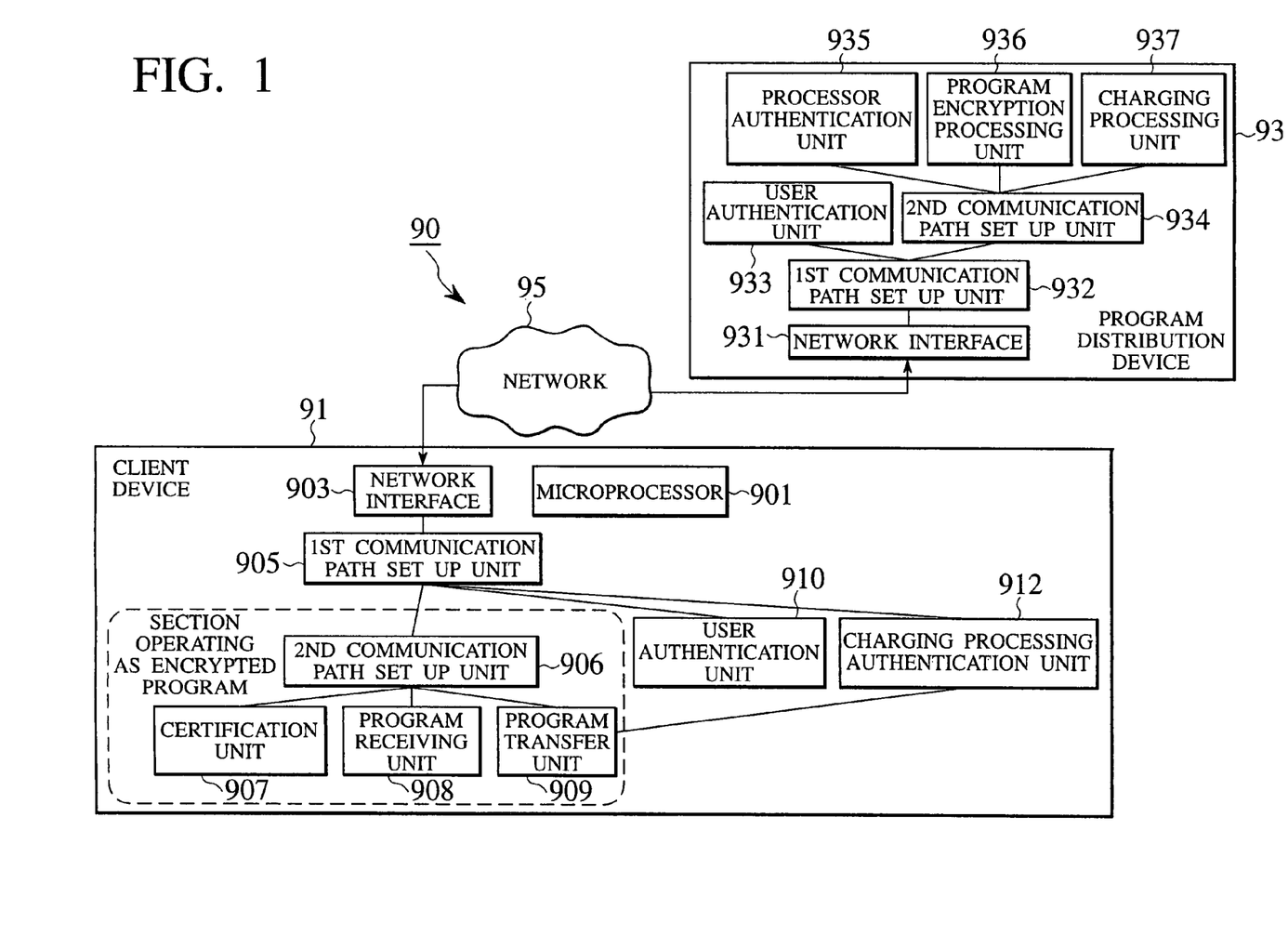
FIG. 1 is a block diagram showing a configuration of a program distribution system according to one embodiment of the present invention.

FIG. 1 shows a program distribution system 90 according to this embodiment, which is basically designed to distribute programs to a computer system with a built-in tamper resistant microprocessor. Consequently, the executable program to be distributed is either directly encrypted by using a key unique to the microprocessor or encrypted by using arbitrary common key and the common key itself is encrypted by using a key unique to the microprocessor and attached to the executable program. In this case, it is impossible to distribute programs by using copies of an identical program recording medium such as mass produced CD-ROMs, so that programs are distributed through a network.

The program distribution system 90 of FIG. 1 includes a network 95, a program distribution device 93 connected to the network 95 for distributing executable programs through the network 95, and a client device 91 connected to the network 95 for receiving the executable programs distributed from the program distribution device 93 through the network 95.

The program distribution device 93 has a first communication path set up unit 932 for setting up a first communication path between the program distribution device 93 and the client device 91, a user authentication unit 933 for carrying out a user authentication of a user who uses the client device 91 through the first communication path, a second communication path set up unit 934 for setting up a second communication path that is directed connected to the microprocessor provided inside the client device 91, a processor authentication unit 935 for verifying the authenticity of the microprocessor 901 of the client device 91 through the second communication path, a program encryption processing unit 936 for producing an encrypted program by encrypting an executable program by using a ciphering key corresponding to the microprocessor of the client device 91, a network interface 931 for distributing the encrypted program to the client device 91 through the second communication path, and a charging processing unit 937.

The client device 91 has a microprocessor 901 in which unique secret key and public key are provided in advance, a network interface 903, a first communication path set up unit 905 for setting up the first communication path between the client device 91 and the program distribution device 93, a user authentication unit 910 for transmitting a user ID of the user who uses the client device 91 through the first communication path, a second communication path set up unit 906 for setting up the second communication path that directly connects the microprocessor 901 to the program distribution device 93, a certification unit 907 for transmitting to the program distribution device 93 a certificate certifying that the microprocessor 901 surely has the secret key and public key that are unique to this microprocessor 901 alone, a program receiving unit 908 for receiving the encrypted executable program through the second communication path, a program transfer unit 909, and a charging processing authentication unit 912.

The first and second communication paths can be set up on different channels of the same transmission line or on different transmission lines. The encrypted program is transmitted to the microprocessor 901 through the second communication path that is directly connected to the microprocessor 901 after the authentication of the microprocessor 901 is carried out, so that the safety of the program distribution can be secured and the illegal act by the user can be prevented.

The program distribution device (server) 93 has a pair of a public key K'p and a secret key K's which are unique in the world, and non-encrypted program files that are original forms of the programs to be distributed. On the other hand, the client device 91 has the microprocessor 901 in which a dedicated program for downloading programs through a network is provided. The downloading program can be provided at a time of purchasing the microprocessor 901 or a system containing the microprocessor 901, or distributed to each user individually by any method such as mailing.

In the downloading program, information such as the public key Kp unique to the microprocessor 901 and the certificate is embedded. More specifically, the certificate Cert certifying that the public key Kp of the microprocessor 901 corresponds to the actually existing microprocessor is stored in the downloading program. This certificate is provided for the purpose of preventing the user from acquiring the plaintext program contents illegally by acquiring the encrypted program using the known set of public key and secret key that are not corresponding to the actual microprocessor 901 and decrypting the encrypted program by using the known secret key.

The certificate contains the public key Kp, and a value $S_{Kcert}[Kp]$ which is an electronic signature using a key Kcert of the certificate authority on the public key Kp that is calculated in advance. The value of Kcert is managed secretly by the certificate authority and not contained in the downloading program. By verifying the public key Kp and the signature $S_{Kcert}[Kp]$ contained in the certificate by using the public key Kval for authentication, it is possible to prove that Kp is the proper public key assigned by the certificate authority such that the known set of keys cannot be used.

This certificate may be provided inside the microprocessor in advance. However, the safety can be improved further by storing the certificate with a valid period in the downloading program and selling the microprocessor with the downloading program. In this case, the downloading program storing the certificate that is regularly updated will be distributed to the purchaser of the microprocessor.

The secret key Ks to be used in the downloading process is encrypted and stored in a data region of the downloading program. A key necessary in decrypting the encrypted secret key Ks is distributedly embedded in downloading program codes as constants. The secret key Ks to be used in the authentication process by the downloading program has the same value as the secret key Ks unique to the microprocessor 901, but it is not obtained by reading the secret key Ks from the microprocessor 901 because the secret key Ks unique to the microprocessor 901 cannot be read out by programs.

In general, the certificate authority CA is utilized for proving that a given host has a specific public key. In the case of using the certificate authority in this system, a combination of the public key of the microprocessor 901 and the user (purchaser) is registered to the certificate authority either at a time of purchasing the microprocessor 901 or later on by on-line processing. In this case, the verification of the certificate by the program distribution device 93 can be omitted.

However, the use of the certificate authority introduces an inconvenience for the user in that the user must register the purchased microprocessor 901 to the certificate authority. For this reason, in this embodiment, the encrypted certificate is stored in the downloading program such that the authentication can be carried out by the program distribution device 93 and the client device 91 alone.

Note that, in this embodiment, it is assumed that the program distribution device 93 is trustworthy so that the program distribution device 93 does not commit any illegal act such as stealing the certificate, and the fact that the program distribution device 93 has a pair of keys K'p and K's that are unique in the world is acknowledged by the certificate authority or the like in advance.

Figure 2:
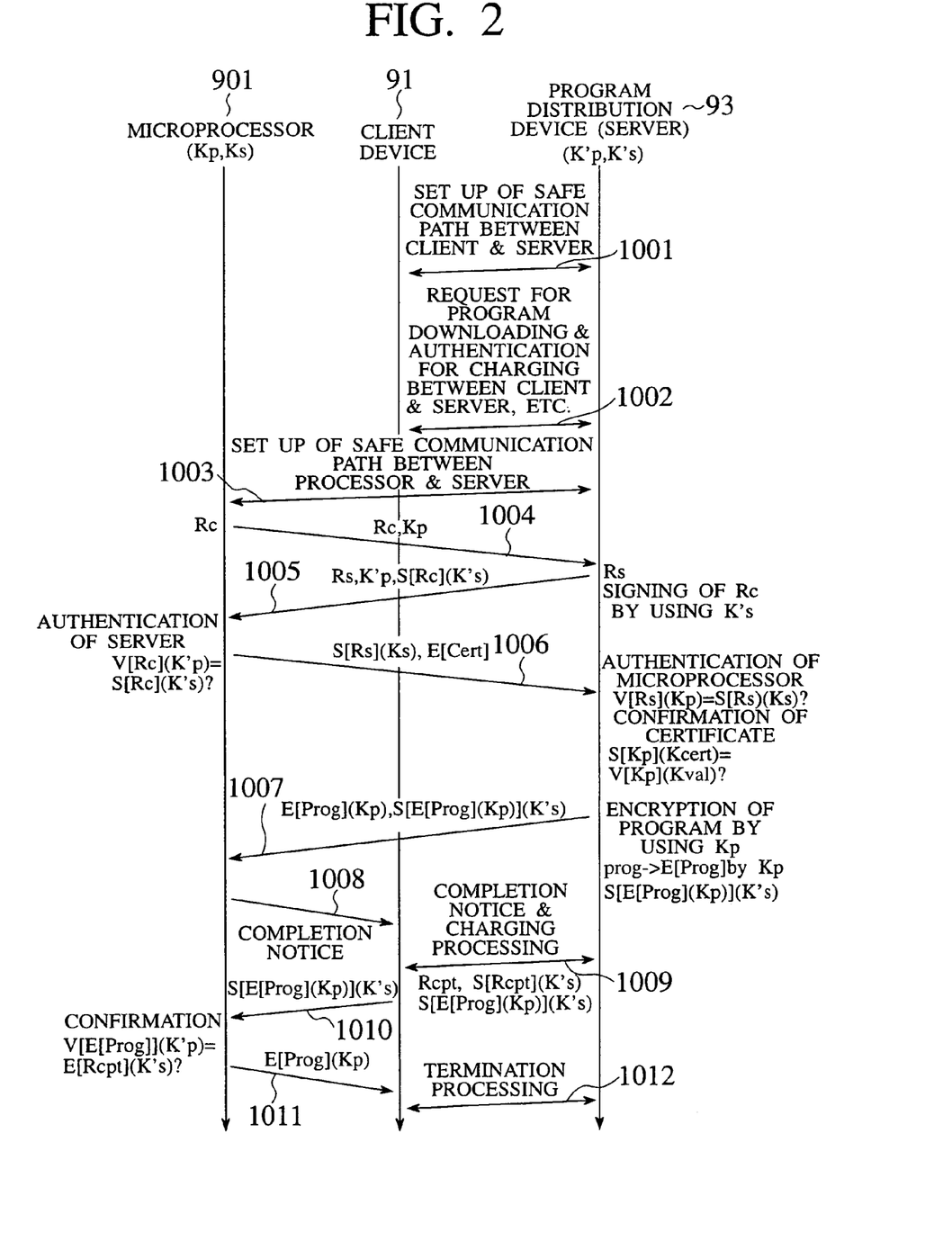
FIG. 2 is a sequence chart for a program distribution operation sequence in the program distribution system of FIG. 1.

FIG. 2 shows an operation sequence for the program distribution processing in the program distribution system 90 of FIG. 1. In the following, the program distribution device 93 is also referred to as server 93.

In the operation sequence of FIG. 2, a safe first communication path is set up between the client device 91 and the server 93 by the first communication path set up units of the respective devices (step 1001). More specifically, a communication start request is send from the client device 91 to the server 93 through the network 95, and the key sharing is carried out in order to maintain the communication path in secret. This can be realized by the known key sharing protocol or DH (Diffie Hellman) scheme. The subsequent communications between the client device 91 and the server 93 will be carried out through this communication path that is set up in the network 95 in this way and that is safe against eavesdropping.

After the first communication path is set up, the client device 91 requests a file (program) to be downloaded to the server 93 (step 1002), and the server 93 carries out the authentication and the charging processing on the user level with the client device 91. In order to protect secrets of the processing from the user in the download process, at least a part of the downloading sequence at the client device 91 described below will be executed by using encrypted codes. Here, a part to be executed by using encrypted codes will be described as operations of the microprocessor 901.

Then, a safe second communication path for directly connecting the microprocessor 901 of the client device 91 and the server 93 is set up on the first communication path (step 1003).

In the present invention, in order to prevent the user from illegally acquiring a part of data processed in the downloading process, not only codes but also data to be placed on a memory during the processing are described in forms that are difficult for the user to read and comprehend in the downloading program. Furthermore, the cipher communication using the secret key is carried out between the server 93 and the microprocessor 901 at the step 1003 in order to improve the protection against the user's illegal act.

This measure is taken because, if the secret key sharing is not employed, there is a possibility for the user's illegal act to acquire the encrypted program by substituting a fake public key into the public key Kp of the microprocessor 901 in the communication message between the server 93 and the microprocessor 901 and obtain the plaintext program by decrypting the encrypted program by using the known secret key corresponding to the fake public key. By enciphering the communications between the server 93 and the microprocessor 901 by using the secret key, it becomes possible to prevent the user's illegal act as described above. Hereafter, the communication between the microprocessor 901 and the server 93 implies the protected communication which is enciphered by using a ciphering key shared by the tamper resistant program on the microprocessor 901 and the server 93.

After the safe second communication path is set up, the microprocessor 901 and the server 93 carry out the mutual authentication. Namely, the microprocessor 901 generates a random number Rc as a challenge with respect to the server 93 and transmits this random number Rc along with the public key Kp unique to the microprocessor 901, to the server 93 through the second communication path (step 1004). Upon receiving the challenge, the server 93 transmits a signature $S_{K's}[Rc]$ obtained by encrypting the random number Rc by using the secret key K's of the server 93 along with a challenge Rs of the server 93 and the public key K'p of the server 93, to the microprocessor 901 (step 1005). Note that in FIG. 2, $S_{K's}[Rc]$ is denoted as S[Rc](K's) and the similar notations are used for the other similar expressions.

The microprocessor 901 checks whether the signature $S_{K's}[Rc]$ transmitted from the server 93 coincides with $V_{K'p}[Rc]$ obtained by hashing Rc by using the public key K'p of the server 93. If they do not coincide, the authentication of the server 93 is a failure so that the subsequent processing is aborted. If the authentication is a success, a response $S_{Ks}[Rs]$ is calculated from the challenge Rs of the server 93 and transmitted along with the certificate E[Cert] to the server 93 (step 1006).

The server 93 compares the response $S_{Ks}[RS]$ with $V_{Kp}[Rs]$, and aborts the processing if they do not coincide. If they coincide, $V_{Kval}[Kp]$ is calculated from the public key Kp of the microprocessor 901 and the public key Kval of the certificate authority, and compared with $S_{Kcert}[Kp]$ corresponding to the public key obtained from the certificate Cert. If they do not coincide, the verification is a failure so that the processing is aborted. If they coincide, the certificate Cert is obtained by decrypting $E_{K'p}[Cert]$ and verified. If the verification fails, the processing is aborted.

If the verification succeeds so that the fact that the microprocessor 901 has the public key Kp is confirmed by the certificate, the server 93 produces the encrypted program $E_{Kp}[Prog]$ from the executable program by using the public key Kp of the microprocessor 901. At this point, the code section of the program is encrypted by using the public key Kp of the microprocessor 901. In this encryption, the ".text" section of the program itself is encrypted by the ".IAT (Import Address Table)" section of the jump table is left in a form of plaintext.

The server 93 then transmits the encrypted program $E_{Kp}[Prog]$ and a signature $S_{K's}[E_{Kp}[Prog]]$ obtained by using the secret key K's of the server 93 to the microprocessor 901 through the second communication path (step 1007). These encrypted program and signature are transmitted through the second communication path that is established directly between the microprocessor 901 and the server 93 so that the client device 91 cannot eavesdrop them.

When the receiving of the program is completed, the microprocessor 901 notifies the downloading completion to the client device 91 (step 1008). The client device 91 then requests the charging processing to the server 93, and the server 93 transmits a receipt Rcpt, a signature $S_{K's}[Rcpt]$ for the receipt obtained by using the secret key K's of the server 93, and the signature $S_{K's}[E_{Kp}[Prog]]$ for the program to the client device 91 (step 1009). The client device 91 preserves the received receipt and its signature, while sending the signature $S_{K's}[E_{Kp}[Prog]]$ for the program received from the server 93 to the microprocessor 901 (step 1010).

The microprocessor 901 verifies the signature $S_{K's}[E_{Kp}[Prog]]$ for the program received from the client device 91 by using the public key K'p of the server 93, and if it is proper, the microprocessor 901 gives the encrypted executable program $E_{Kp}[Prog]$ to the client device 91 (step 1011). Upon receiving the encrypted executable program $E_{Kp}[Prog]$, the client device 91 carries out the termination processing for the communication channel with respect to the server 93 (step 1012).

Thereafter, the microprocessor 901 executes the encrypted program in a prescribed manner.

Figure 3:
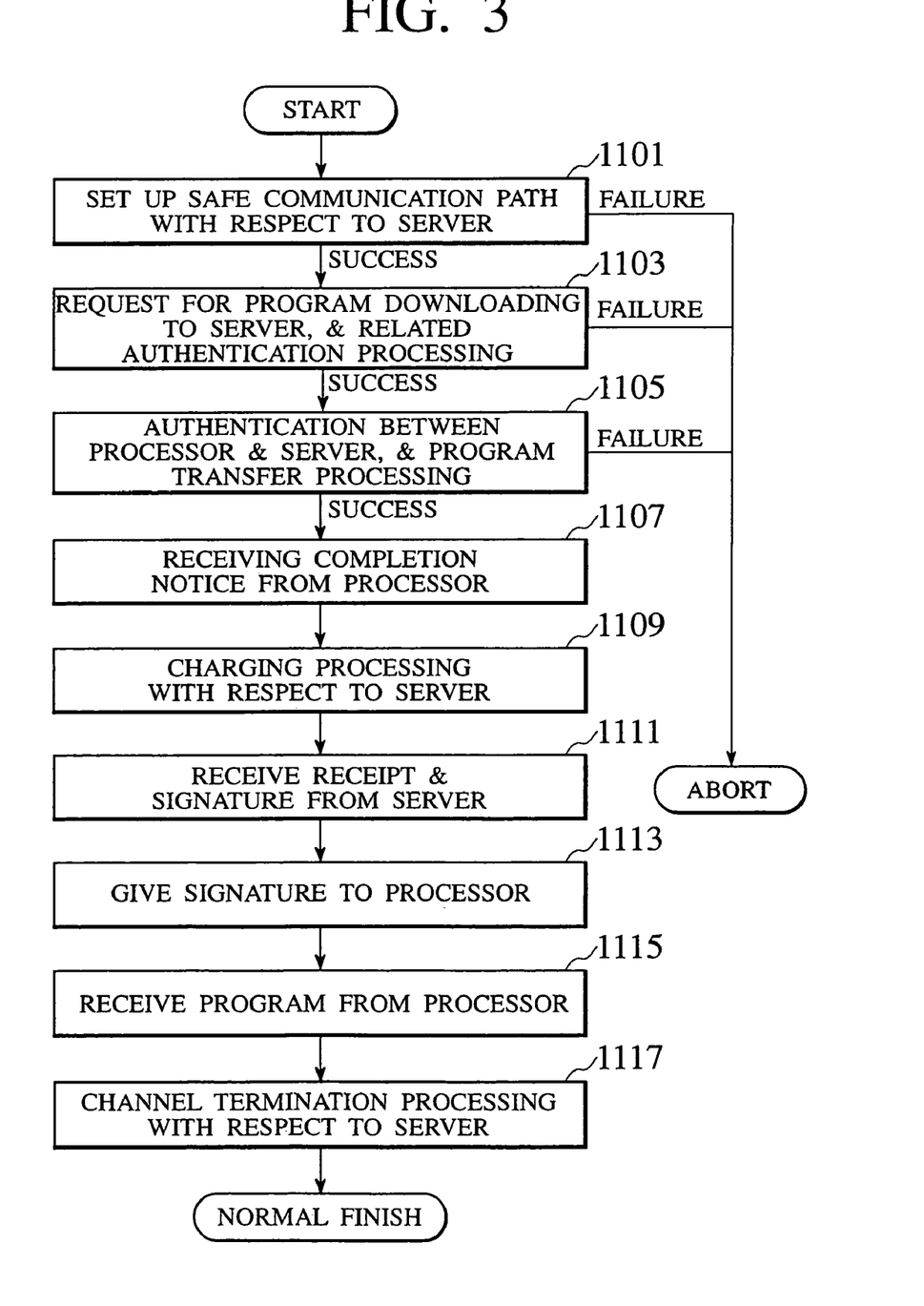
FIG. 3 is a flow chart for a processing procedure of a client device in the operation sequence of FIG. 2.

FIG. 3 shows the processing procedure of the client device 91 in the operation sequence of FIG. 2. This processing procedure is substantially as already explained with reference to FIG. 2, and proceeds as follows.

First, the first communication path is set up between the client device 91 and the server 93 (step 1101). Then, the program downloading request is made with respect to the server 93, and the authentication processing as described above is carried out (step 1103). Then the authentication between the microprocessor 901 and the server 93 is carried out and a transfer of the program to the microprocessor 901 is carried out (step 1105). Then, the receiving completion notice is received from the microprocessor 901 (step 1107), the charging processing is carried out with the server 93 (step 1109), and the receipt and the signature are received from the server 938 step 1111). Then, the signature are given to the microprocessor 901 (step 1113), the encrypted program is received from the microprocessor 901 (step 1115), and the communication channel between the client device 91 and the server 93 is terminated (step 1117).

Figure 4:
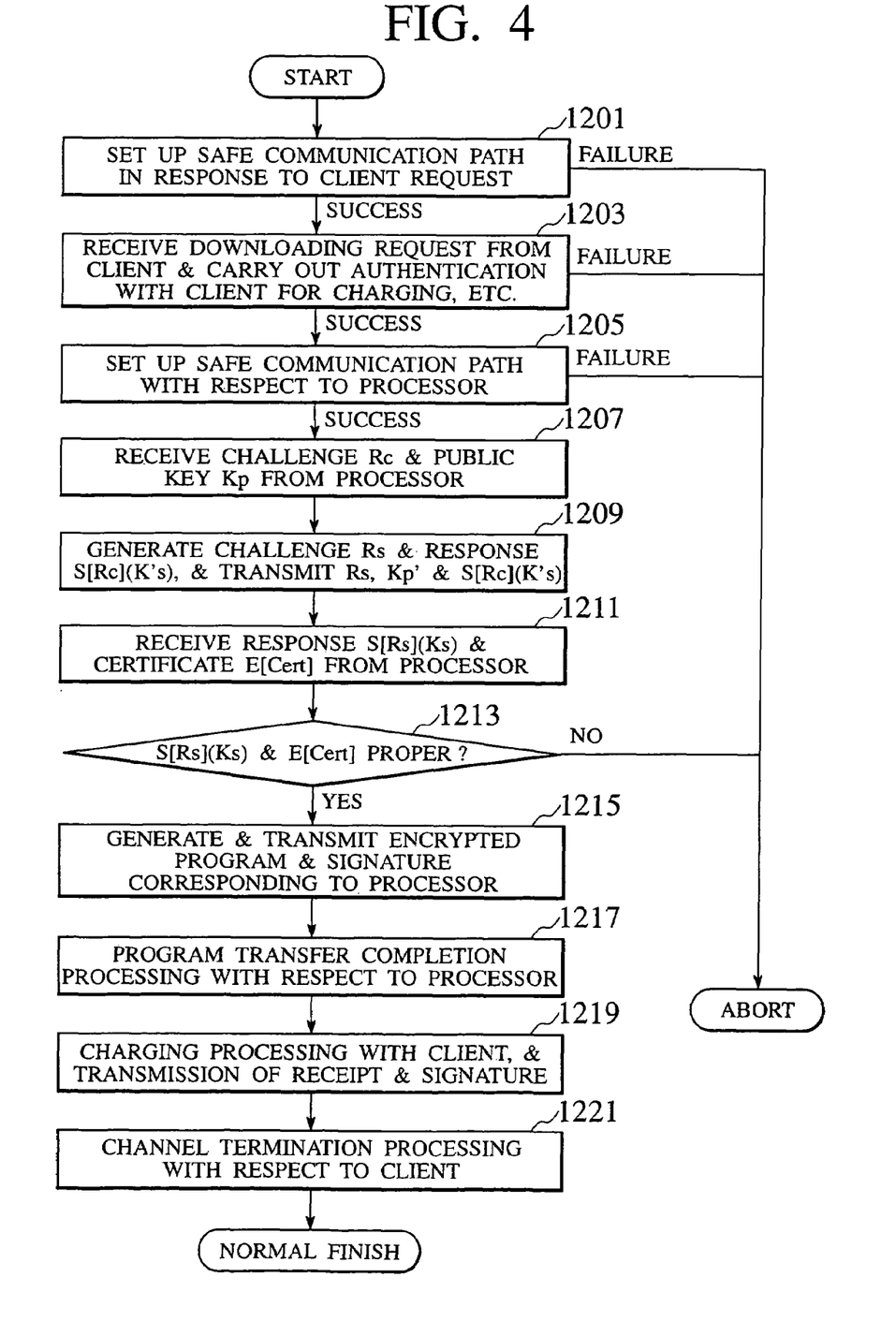
FIG. 4 is a flow chart for a processing procedure of a program distribution device (server) in the operation sequence of FIG. 2.

FIG. 4 shows the processing procedure of the server 93 in the operation sequence of FIG. 2, which proceeds as follows.

First, the first communication path is set up in response to the request from the client device 91 (step 1201). Then, the program downloading request from the client device 91 is received, and the authentication with the client is carried out for the purpose of charging or the like (step 1203). Then, the second communication path is set up between the server 93 and the microprocessor 901 (step 1205), and the challenge Rc and the public key Kp are received from the microprocessor 901 (step 1207). Then, the server side challenge Rs and the response $S_{K's}[Rc]$ are generated and transmitted along with the public key K'p of the server 93 to the microprocessor 901 (step 1209). Then, the response $S_{Ks}[Rs]$ and the certificate E[Cert] are received from the microprocessor 901 (step 1211), and $S_{Ks}[Rs]$ and E[Cert] received from the microprocessor 901 are verified (step 1213). When the verification fails, the processing is aborted. When the verification succeeds, the encrypted program and the signature corresponding to the microprocessor 901 are generated and transmitted to the microprocessor 901 (step 1215), and the program transfer between the server 93 and the microprocessor 901 is terminated (step 1217). Then, the charging processing is carried out with respect to the client device 91 and the receipt and the signature are transmitted (step 1219), and the communication channel between the server 93 and the client device 91 is terminated (step 1221).

Figure 5:
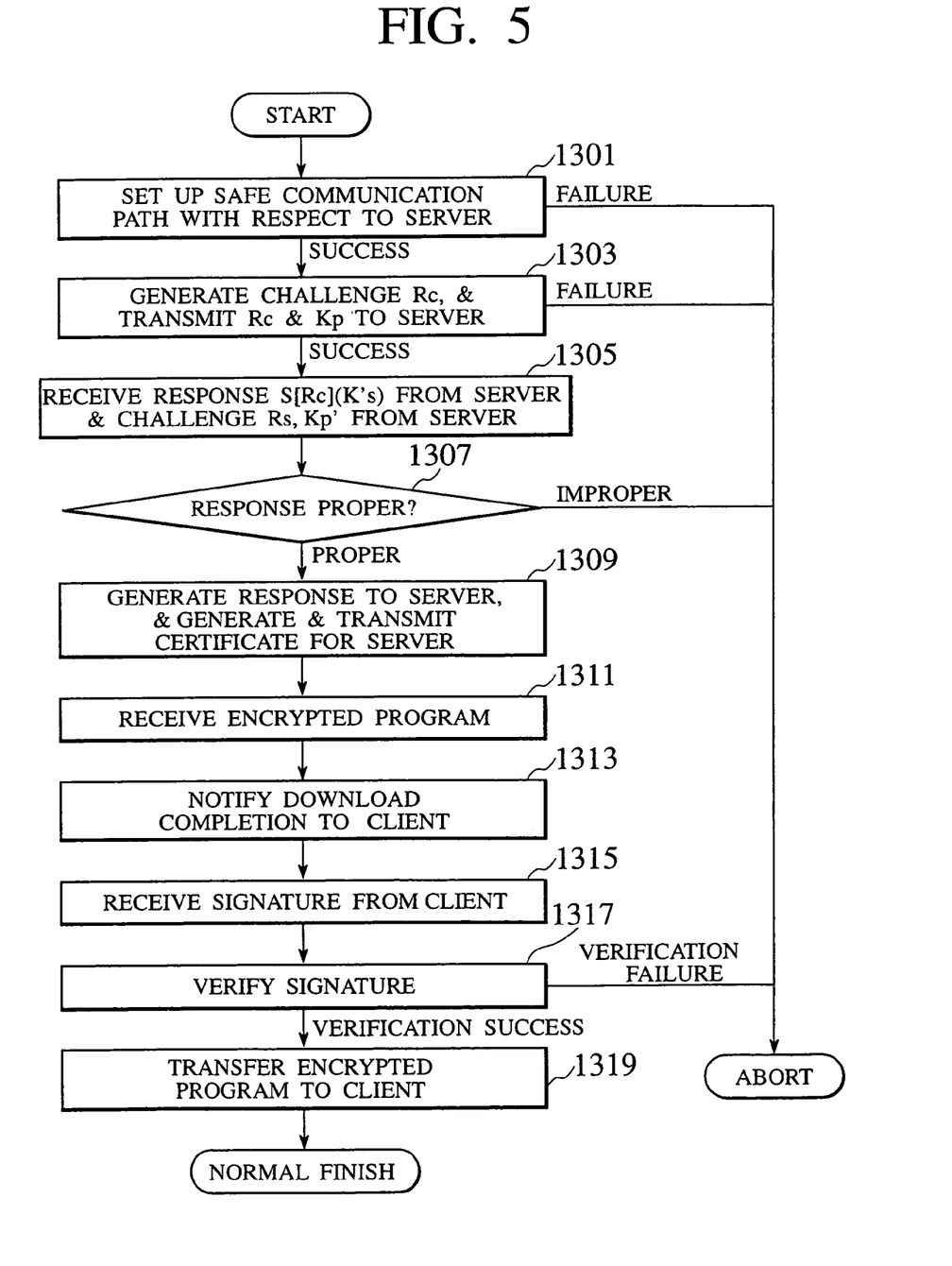
FIG. 5 is a flow chart for a processing procedure of a microprocessor in the operation sequence of FIG. 2.

FIG. 5 shows the processing procedure of the microprocessor 901 in the operation sequence of FIG. 2, which proceeds as follows.

First, the second communication path between the microprocessor 901 and the server 93 is set up (step 1301). Then, the challenge Rc is generated and transmitted along with the public key Kp unique to the microprocessor 901, to the server 93 (step 1303). When the transmission succeeds, the response $S_{K's}[Rc]$, the challenge Rs and the public key K'p are received from the server 93 (step 1305). Then, whether the response is proper or not is judged (step 1307). If it is improper the processing is aborted. If it is proper, the response with respect to the server 93 and the certificate corresponding to the server 93 are generated and transmitted (step 1309). Then, the encrypted program is received from the server 93 (step 1311), and when the receiving is completed, the downloading completion is notified to the client device 91 (step 1313). Then, the signature is received from the client device 91 (step 1315), and the signature is verified (step 1317). If the verification fails the processing is aborted. If the verification succeeds, the encrypted program is transferred to the client device 91 (step 1319).

In the operation sequence of FIG. 2, if the encrypted program E[prog] cannot be acquired due to the abnormal finishing of the downloading program after the completion of the charging processing, the client has the right to download the program from the server 93 again according to the preserved receipt. In this case, the charging will not be carried out again, and the program other than the encrypted program for the microprocessor 901 will not be acquired.

Also, in the operation sequence of FIG. 2, the server 93 may use the common key for the encryption of the program instead of the public key of the microprocessor 901. In this case, the server 93 selects the common key Kx and the encryption algorithm, encrypts the program by using the common key Kx, encrypts the common key Kx by using the public key unique to the microprocessor 901, and transmits the program to the microprocessor 901 after enciphering the communication between the server 93 and the microprocessor 901. At this point, the server 93 may select the encryption algorithm from encryption algorithms that can be processed by the microprocessor 901, by adding a step for inquiring the encryption/decryption functions provided in the microprocessor 901 from the server 93 to the microprocessor 901 after the second communication path is set up.

In this case, the throwaway common key for each program is used for decrypting the execution codes so that a key length can be made shorter and a size of the page table constructed in a memory of the client device 91 or a cache of the microprocessor 901 can be made smaller.

The downloading procedure as described above is also applicable to the handling of the secret information such as database or customer information. This downloading procedure can also be extended to be applicable to any music or video data other than the executable program, where the only difference from the case of the program will be that the program is encrypted in such a way that the program can be executed only by the target microprocessor in the case of the program.

According to the program distribution system of the present invention, the encrypted program can be distributed from the program distribution device to the client device through the network safely and surely. Also, by using the tamper resistant downloading program to be executed at the microprocessor, the program downloading can be carried out directly between the program distribution device and the microprocessor safely and efficiently, without any intervention by a third party.

Also, by recording the program code section in an encrypted form and storing the IAT region for directly referring to external programs in a non-encrypted plaintext form in a computer readable recording medium, the relocation can be carried out correctly at a time of the program execution.

It is to be noted that the above embodiment is described for an exemplary case of using a tamper resistant microprocessor, but it should be apparent that the present invention is equally applicable to the case of using a tamper resistant processor in general.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A program distribution device for distributing executable programs through a network to a client device having a tamper resistant processor which is provided with a unique secret key and a unique public key corresponding to the unique secret key in advance, the program distribution device comprising:

a first communication path set up unit configured to set up a first communication path between the program distribution device and the client device for communications other than transfer of the executable programs;

a second communication path set up unit configured to set up a second communication path directly connecting the program distribution device and the tamper resistant processor within the client device and dedicated for transfer of the executable programs such that the executable programs are not accessible by any other parts of the client device, the first and second communication paths being set up as different channels on an identical transmission line or as different transmission lines;

an encryption processing unit configured to produce an encrypted program by encrypting an executable program to be distributed to the client device and executed within the tamper resistant processor, by using the unique public key of the tamper resistant processor which is not shared with any other parts of the client device; and a transmission unit configured to transmit the encrypted program to the tamper resistant processor through the second communication path so that the encrypted program is directly delivered to the tamper resistant processor and the encrypted program can be decrypted and executed only within the tamper resistant processor which is an only entity that has the unique secret key corresponding to the unique public key.

2. The program distribution device of claim 1, further comprising:
a user authentication unit configured to carry out authentication of a user who is using the client device, by using a user ID of the user received from the client device through the first communication path.

3. The program distribution device of claim 1, further comprising:
a processor authentication unit configured to carry out authentication of the tamper resistant processor, by verifying a certificate certifying that the tamper resistant processor surely has the unique secret key and the unique public key, which is received from the client device through the second communication path.

4. The program distribution device of claim 1, wherein the encryption processing unit encrypts the executable program by using the unique public key received from the tamper resistant processor through the second communication path.

5. The program distribution device of claim 1, wherein the encryption processing unit encrypts the executable program by using a common key, and encrypts the common key by using the unique public key received from the tamper resistant processor through the second communication path; and
the transmission unit transmits the encrypted program along with an encrypted common key to the tamper resistant processor through the second communication path.

6. The program distribution device of claim 1, wherein communications through the second communication path are cipher communications.

7. A client device for receiving programs distributed from a program distribution device through a network, the client device comprising:
a tamper resistant processor which is provided with a unique secret key and a unique public key corresponding to the unique secret key in advance;
a first communication path set up unit configured to set up a first communication path between the program distribution device and the client device for communications other than transfer of the executable programs;
a second communication path set up unit configured to set up a second communication path directly connecting the program distribution device and the tamper resistant processor within the client device and dedicated for transfer of the executable programs such that the executable programs are not accessible by any other parts of the client device, the first and second communication paths being set up as different transmission lines; and
a program receiving unit configured to receive an encrypted program obtained by encrypting an executable program to be distributed to the client device and executed within the tamper resistant processor, by using the unique public key of the tamper resistant processor which is not shared with any other parts of the client device, from the program distribution device through the second communication path, so that the encrypted program is directly delivered to the tamper resistant processor and the encrypted program can be decrypted and executed only within the tamper resistant processor which is an only entity that has the unique secret key corresponding to the unique public key.

8. The client device of claim 7, further comprising:
a user authentication unit configured to carry out authentication of a user who is using the client device with respect to the program distribution device, by transmitting a user ID of the user to the program distribution device through the first communication path.

9. The client device of claim 7, further comprising:
a certification unit configured to carry out authentication of the tamper resistant processor with respect to the program distribution device, by transmitting a certificate certifying that the tamper resistant processor surely has the unique secret key and the unique public key, through the second communication path.

10. The client device of claim 7, wherein the program receiving unit receives the encrypted program which is encrypted by using the unique public key notified from the tamper resistant processor to the program distribution device through the second communication path.

11. The client device of claim 7, wherein the program receiving unit receives the encrypted program which is encrypted by using a common key, and an encrypted common key which is encrypted by using the unique public key notified from the tamper resistant processor to the program distribution device through the second communication path.

12. The client device of claim 7, wherein communications through the second communication path are cipher communications.

13. A program distribution system, comprising:
a program distribution device connected to a network, for distributing executable programs through the network; and
a client device connected to the network, for receiving the executable programs distributed from the program distribution device through the network;
wherein the client device has:
a tamper resistant processor which is provided with a unique secret key and a unique public key corresponding to the unique secret key in advance;
a client side first communication path set up unit configured to set up a first communication path between the program distribution device and the client device for communications other than transfer of the executable programs;
a client side second communication path set up unit configured to set up a second communication path directly connecting the program distribution device and the tamper resistant processor within the client device and dedicated for transfer of the executable programs such that the executable programs are not accessible by any other parts of the client device, the first and second communication paths being set up as different channels on an identical transmission line or as different transmission lines; and
a program receiving unit configured to receive an encrypted program from the program distribution device through the second communication path; and
the program distribution device has:
a server side first communication path set up unit configured to set up the first communication path between the program distribution device and the client device for communications other than the transfer of the executable programs;

a server side second communication path set up unit configured to set up the second communication path directly connecting the program distribution device and the tamper resistant processor within the client device and dedicated for transfer of the executable programs;

an encryption processing unit configured to produce the encrypted program by encrypting an executable program to be distributed to the client device and executed within the tamper resistant processor, by using the unique public key of the tamper resistant processor which is not shared with any other parts of the client device; and a transmission unit configured to transmit the encrypted program to the tamper resistant processor through the second communication path so that the encrypted program is directly delivered to the tamper resistant processor and the encrypted program can be decrypted and executed within the tamper resistant processor which is an only entity that has the unique secret key corresponding to the unique public key.

14. A method for distributing executable programs through a network from a program distribution device to a client device having a tamper resistant processor which is provided with a unique secret key and a unique public key corresponding to the unique secret key in advance, the method comprising the steps of:

setting up a first communication path between the program distribution device and the client device for communications other than transfer of the executable programs;

setting up a second communication path directly connecting the program distribution device and the tamper resistant processor within the client device and dedicated for transfer of the executable programs such that the executable programs are not accessible by any other parts of the client device, the first and second communication paths being set up as different channels on an identical transmission line or as different transmission lines;

producing an encrypted program by encrypting an executable program to be distributed to the client device and executed within the tamper resistant processor, by using the unique public key of the tamper resistant processor which is not shared with any other parts of the client device, at the program distribution device; and transmitting the encrypted program from the program distribution device to the tamper resistant processor through the second communication path so that the encrypted program is directly delivered to the tamper resistant processor and the encrypted program can be decrypted and executed only within the tamper resistant processor which is an only entity that has the unique secret key corresponding to the unique public key.

15. The method of claim 14, further comprising the step of:

carrying out authentication of a user who is using the client device, by using a user ID of the user received from the client device through the first communication path.

16. The method of claim 14, further comprising the step of:

carrying out authentication of the tamper resistant processor, by verifying a certificate certifying that the tamper resistant processor surely has the unique secret key and the unique public key, which is received from the client device through the second communication path.

17. The method of claim 14, wherein the producing step encrypts the executable program by using the unique public key received from the tamper resistant processor through the second communication path.

18. The method of claim 14, wherein the producing step encrypts the executable program by using a common key, and encrypts the common key by using the unique public key received from the tamper resistant processor through the second communication path; and the transmitting step transmits the encrypted program along with an encrypted common key to the tamper resistant processor through the second communication path.

19. The method of claim 14, wherein communications through the second communication path are cipher communications.

* * * * *